United States Patent [19]
Mockenhaupt et al.

[11] Patent Number: 6,039,323
[45] Date of Patent: Mar. 21, 2000

[54] RUBBER MOLDED GASKET WITH COMPRESSION LIMITER

[75] Inventors: Martin Mockenhaupt, Highland Park; Michael J. Szott, Hanover Park, both of Ill.

[73] Assignee: Fel-Pro Incorporated, Skokie, Ill.

[21] Appl. No.: 09/021,887

[22] Filed: Feb. 11, 1998

[51] Int. Cl.[7] ............................... F02F 11/00; F02F 15/02
[52] U.S. Cl. ........................ 277/593; 277/598; 277/600
[58] Field of Search .................................. 277/593, 598, 277/600

[56] References Cited

U.S. PATENT DOCUMENTS

| | | | |
|---|---|---|---|
| 3,930,656 | 1/1976 | Jelinek | 277/593 |
| 4,535,996 | 8/1985 | Cardis et al. | |
| 4,655,463 | 4/1987 | Inciong et al. | 277/593 |
| 4,867,461 | 9/1989 | Shimmell | 277/593 |
| 4,955,621 | 9/1990 | Skrycki | 277/593 |
| 5,121,932 | 6/1992 | Goldman et al. | 277/600 |
| 5,513,603 | 5/1996 | Ang et al. | 277/593 |
| 5,536,023 | 7/1996 | Surbrook et al. | 277/593 |

*Primary Examiner*—Chuck Y. Mah
*Attorney, Agent, or Firm*—Brinks Hofer Gilson & Lione

[57] ABSTRACT

A valve cover gasket assembly for an automotive engine includes a rigid core having a plurality of pairs of notches, with each pair comprising one notch on the inner edge of the core and one notch on the outer edge. The assembly further includes a rigid stop member for each pair of notches, each stop member having a portion defining a fastener hole and a spaced apart lug. The stop members are secured to the core by engagement with the notches. When secured in this manner, the portion of each stop member defining the fastener hole is offset laterally from the core. An elastomeric envelope having elastomeric beads is applied over the core and a portion of each stop member, so that the beads extend continuously around the length of the assembly.

12 Claims, 3 Drawing Sheets

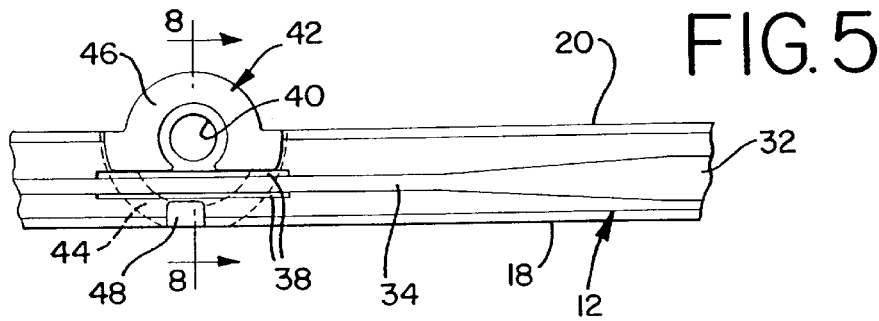
FIG. 5
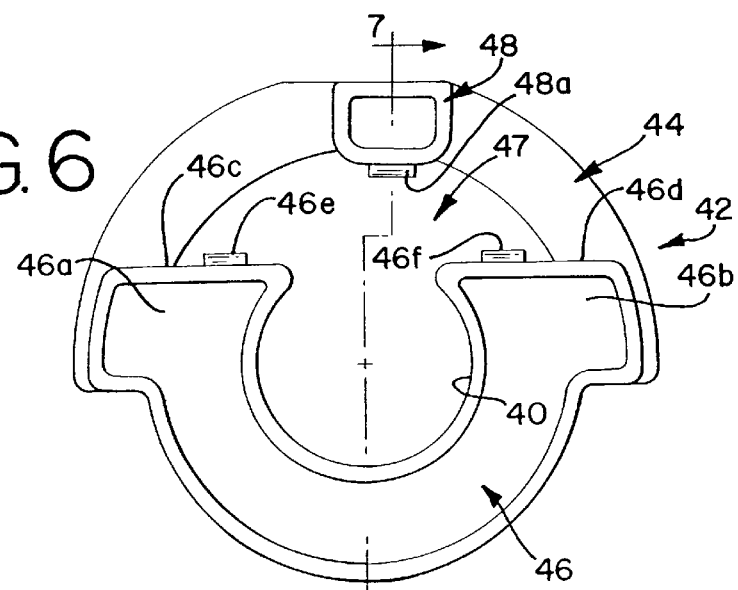
FIG. 6
FIG. 7
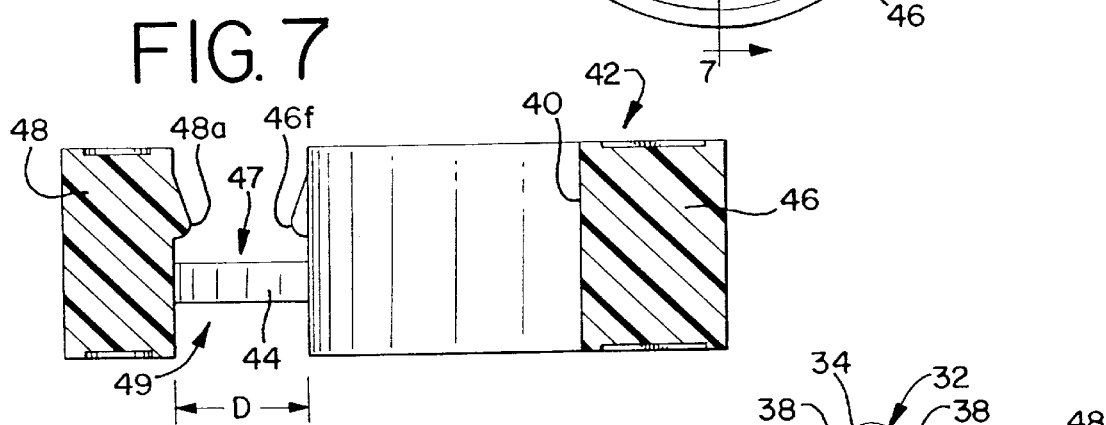
FIG. 8
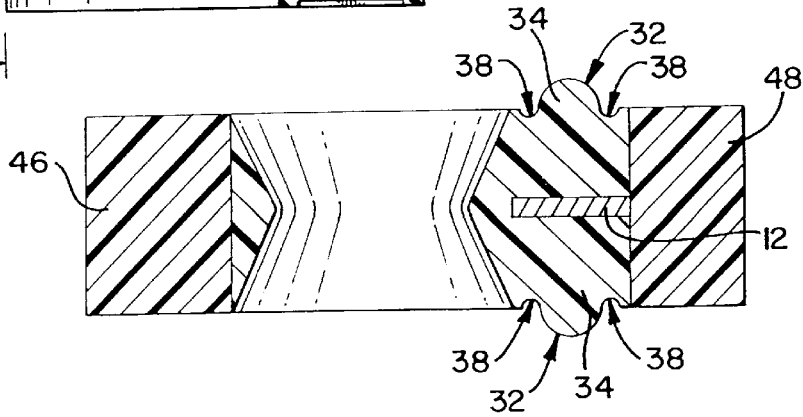

RUBBER MOLDED GASKET WITH COMPRESSION LIMITER

BACKGROUND OF THE INVENTION

This invention relates to gaskets for automotive engines and, more particularly, to sealing applications with limited available compression area and to applications with variable land area.

In a typical environment for a valve cover gasket according to the present invention, engine flanges are available between which a gasket is needed for sealing purposes. When a gasket is installed between the engine flanges, fasteners such as bolts are positioned in holes formed in the flanges and gasket and are torqued down to suitably compress the gasket between the flanges. A typical gasket may be provided with a rigid core, such as metal, within a rubber or other elastomeric envelope, and with an elastomeric bead for sealing. Sometimes the bolts are excessively tightened to such an extent that the elastomer splits. This can cause fluid leakage and gasket failure.

In gaskets of this type, it has been determined that the splitting of the rubber is generally in line with the edge of the metal cores. It appears that when the gasket is compressed between the engine flanges, the rubber is excessively stressed in multiple directions and becomes displaced. When it is displaced along or towards the edge of a metal core, the core edge may cut the rubber which moves relative to it. The problem of splitting the rubber is of particular concern around the bolt holes. In the past, stops of hard, rigid material have been provided around the holes. For example, in U.S. Pat. No. 4,535,996, round, washer-like stops or limiters are provided which extend through holes in both the metal core and rubber envelope. These stops surround the bolt hole and, due to their rigidity, limit and restrict the deformation and displacement of the rubber in the zones around the bolt holes. The rubber is thus prevented from moving sufficiently to be cut by the edge of the metal core because when the stop engages the surfaces to be sealed, i.e., the engine flanges, it thereafter prevents further displacement of the rubber. Some engines have flanges with limited surface land area. When conventional compression limiters or stops are used in such applications, they may not seat on the contact surfaces and the stops therefore may not limit the bolt tightening, leading to split rubber and gasket failure. In addition, for those engines with limited land area at least in some areas of the flanges, the gasket must be constructed with a correspondingly limited dimension in those areas. If such a gasket were constructed with conventional round, washerlike stops, there would be insufficient space on the gasket to form a useful sealing bead because the stop might extend across substantially the entire width of the gasket. Thus, there is a need for a valve cover gasket assembly suitable for use in applications where the available flange width is very narrow.

SUMMARY OF THE INVENTION

In accordance with the present invention, a gasket assembly comprises a rigid annular core member having upper and lower surfaces; a plurality of spaced, rigid stop members secured to the core member, each stop member having a first portion of a first thickness and a second stop portion of a second substantially greater thickness than the first portion, the second portion substantially defining a fastener hole offset laterally from the core member; and an elastomeric material substantially covering the upper and lower surfaces of the core member and the first portion of each stop member.

In a the preferred embodiment, a gasket assembly is constructed with a rigid core member having upper and lower surfaces and opposing inner and outer edges. The assembly further includes a plurality of rigid stop members, each stop member defining a fastener hole and secured to the core member at pairs of notches located on the edges of the core member The stops each have a first portion of a first thickness and a U-shaped second portion of a greater thickness, the first portion lying primarily along one of the surfaces of the core member and the second portion primarily offset laterally into the interior space defined by the gasket assembly. The second portion substantially defines the bolt hole and has a pair of shoulders which bear against a notch and to which the first portion connects. The stop member further includes a lug spaced apart from the second portion by the core member and formed integrally with the first portion. The lug engages the other of the notches. The surfaces of the core and the first portion of the stop members are substantially covered with elastomeric layers. The second portion of each stop member and the lug are each of the same thickness, which is less than the combined thickness of the core and the elastomeric layers.

Because gasket assemblies of this invention may be compressed only a limited amount, perhaps several thousandths of an inch, and because the valve cover flange bows between the fastener holes, a sealing bead is desirable along the entire length of the gasket to assure effective sealing. Consequently, the preferred inventive gasket assembly includes a bead of a U-shape or domed type formed integrally with each of the elastomeric layers. The spacing of the lug and second portion of the stop member permits the beads to extend continuously around the layers and above the main surfaces of the gasket, including between the U-shaped second portion and lug of each stop member.

Further objects, features and advantages of the invention will become apparent from the following drawings and description.

DESCRIPTION OF THE DRAWINGS

FIG. 5 is an enlarged plan view of the circled portion of FIG. 1.

FIG. 6 is an enlarged plan view of a stop member of the gasket of FIG. 1.

FIG. 7 is a cross-sectional view of the stop member of FIG. 1 taken along line 7—7 of FIG. 6.

FIG. 8 is an enlarged cross-sectional view of the gasket of FIG. 1 taken along line 8—8 of FIG. 5.

DETAILED DESCRIPTION OF THE DRAWINGS AND THE PREFERRED EMBODIMENTS

Figure 1:
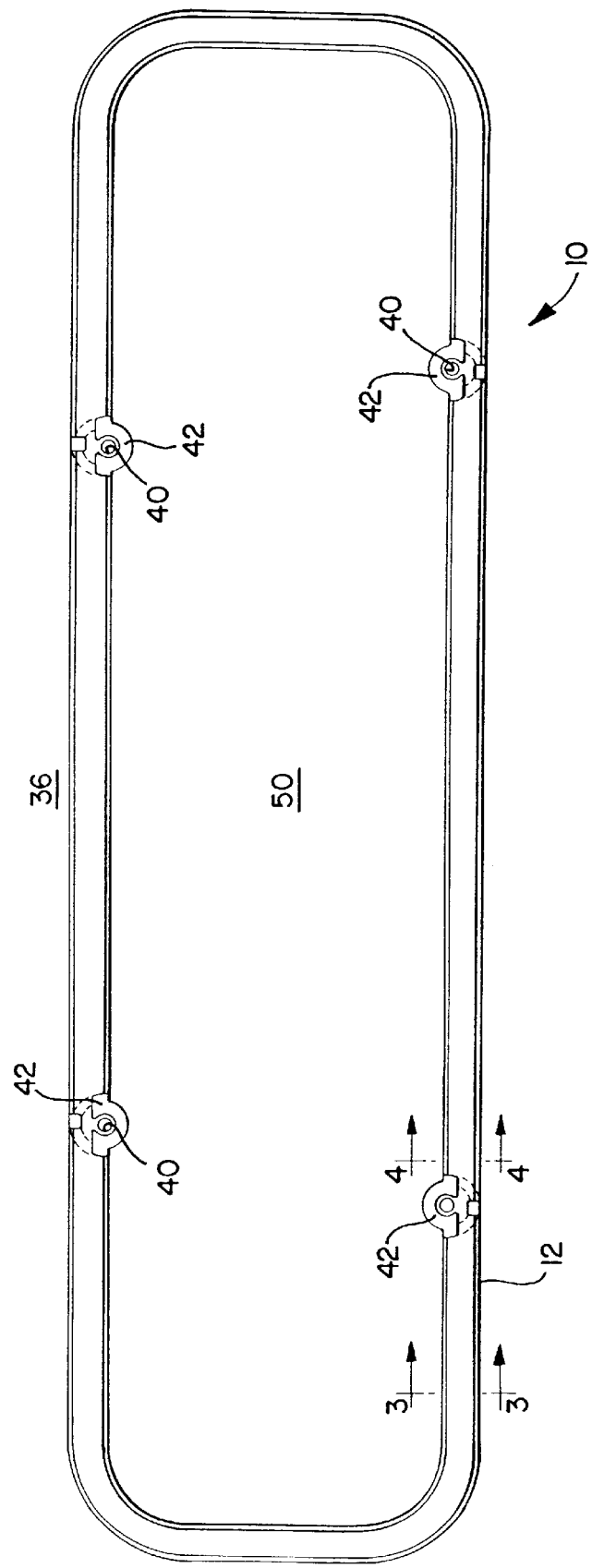
FIG. 1 is a plan view of a gasket made in accordance with the present invention.
Figure 2:
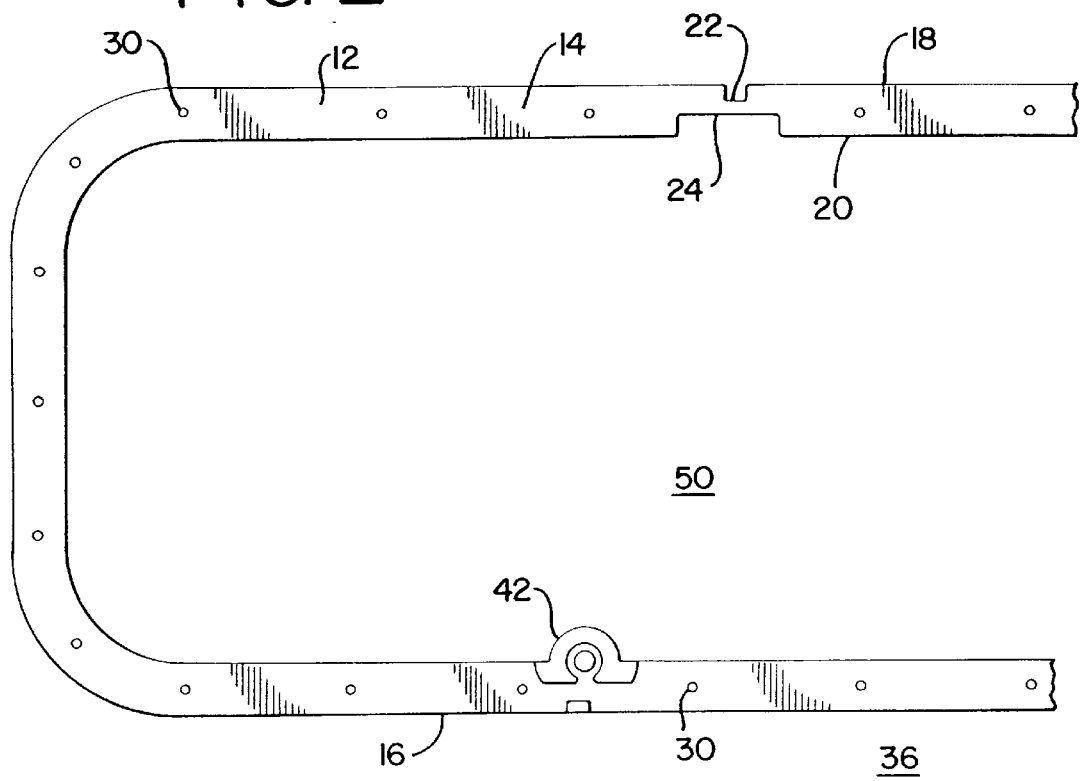
FIG. 2 is a plan view of part of the metal core and an associated stop member of the gasket of FIG. 1.

As shown in FIGS. 1 and 2, a gasket in accordance with the present invention includes a gasket assembly 10 formed for use as a valve cover gasket. Gasket assembly 10 comprises a generally rectangular rigid annular core 12, preferably formed of metal such as cold rolled steel, having an opposed pair of upper and lower surfaces 14,16 and an opposed pair of outer and inner edges 18, 20. Core 12 further includes pairs of notches formed at spaced bolt hole locations around the core 12, each pair including a first or outer notch 22 and a second or inner notch 24. First notch 22 is formed on outer edge 18 and second notch 24 is formed on inner edge 20. Core 12 may be stamped, punched or otherwise formed from cold rolled steel and in the illustrated gasket is about 0.405 inch wide and about 0.019 inch thick.

Figure 3:
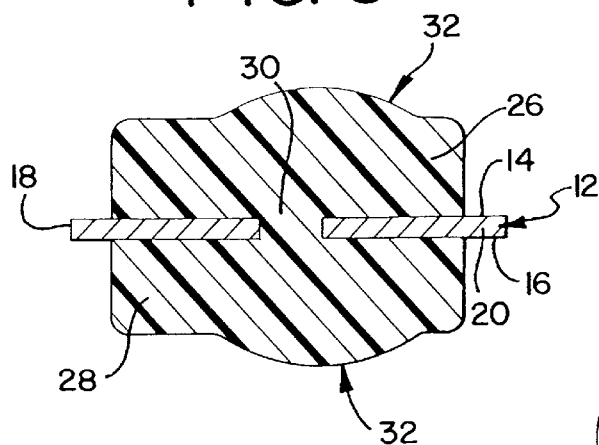
FIG. 3 is an enlarged cross-sectional view of the gasket of FIG. 1 taken along line 3—3 of FIG. 1.
Figure 4:
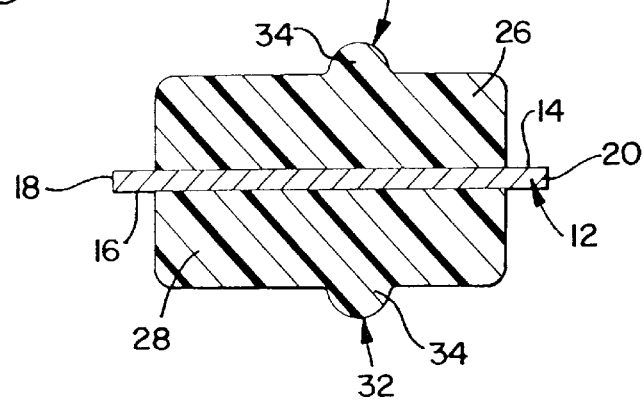
FIG. 4 is an enlarged cross-sectional view of the gasket of FIG. 1 taken along line 4—4 of FIG. 1.

As seen in FIGS. 3 and 4, upper and lower surfaces 14, 16 are each substantially covered with elastomeric layers 26, 28 formed of molded rubber and which are about 0.325 inch wide and about 0.09 inch thick. The elastomer may be nitrile, polyacrylic, silicone, or other suitable rubber. The elastomeric layers are anchored to the core through perforations 30 in the core (FIGS. 2, 3). Extending generally centrally along the length of the elastomeric layers 26, 28 is an elongated sealing bead 32 integrally formed from the elastomer (FIGS. 3, 5). The bead 32 is domed or generally U-shaped in cross-section, and extends outwardly from layers 26, 28 as seen in FIGS. 3 and 4. In the zones of bolt holes 40, the bead 32 tapers both in height and width (see FIG. 5), i.e. both in the vertical and horizontal planes, to form transitional bead sections 34. Specific dimensions and configurations of the bead 32 to be used will depend in part upon the engine environment in which the gasket assembly is to be used.

Transitional bead sections 34 provide continuity for the elongated bead 32 in the zones of bolt holes 40 so that the bead 32 isolates the interior space 50 to be sealed from the exterior area 36 surrounding the gasket. Transitional bead sections 34 may be of a lesser overall height and width than the remainder of the elongated bead 32. Together, elongated bead 32 and transitional bead sections 34 form a continuous bead around the entire length of the gasket assembly.

Elongated bead 32 is preferably about 0.031 inch in height and about 0.187 inch in width. Transitional bead sections 34 are desirably about 0.03 inch in height and about 0.08 inch in width. In the zones of bolt holes 40, elongated recesses 38 approximately 0.01 inch in depth are formed on either side of transitional bead sections 34 (FIGS. 5 and 8). These recesses help control the compression of the bead 32 in the zone of the bolt holes.

Each pair of notches 22, 24 receives and retains a stop member 42 (FIGS. 2, 5, 6), which desirably snap-attaches to the core 12. Each stop member 42 defines a central bolt hole 40. The stop members 42 are preferably composed of hard plastic such as nylon, which is suitably temperature resistant and has a suitable mechanical strength. Each stop member 42 comprises a first portion 44, a second portion 46, and a lug 48. Second portion 46 is generally U-shaped, while first portion 44 connects lug 48 to the ends 46a, 46b of second portion 46. Thus, lug 48 is spaced apart from U-shaped second portion 46 by a distance D (FIG. 7). Distance D is sufficient to accommodate the transitional section 34 (FIG. 5) between lug 48 and the U-shaped second portion 46, and to allow appropriate deformation of the bead as will be described. U-shaped second portion 46 has a thickness slightly less than the combined thickness of core 12 and elastomeric layers 26, 28. Lug 48 preferably has a thickness substantially equal to the thickness of second portion 46 so that it can act as part of the stop, and a width slightly less than the width of notch 22. First portion 44 which is curved and annular in plan view connects lug 48 with U-shaped second portion 46. First portion 44 has a thickness substantially less than second portion 46 and in plan view helps to define clear-through open zones 47, 49 above and below its inner surface and between lug 48 and the second portion 46. Thus, the zones 47, 49 above and below first portion 44 are devoid of the material of which the stop 42 is made.

As such, when the stops are molded with the core, the elastomeric material of which the layers 26, 28 are formed fills the zones 47, 49 above and below the first portion 44 and also fills the zone between the shoulder bosses 46e, 46f, and 48a. Because the bead 32 in the zone of the bolt holes (and stops) is reduced in width to a width dimension substantially less than the distance D, the bead 32 will satisfactorily deform and displace. If the bead had substantially no underlying resilient material in that area, the bead would find it much more difficult to effectively seal. The resilient elastomeric material under the bead 32 in the zone of the stops permit the provision of the elongated recesses 38 (FIG. 8) which also help to control bead compression thereof.

When stop member 42 is properly secured to core 12, lug 48 fits snugly within first notch 22 and is laterally flush with outer edge 18 of core 12. Further, inner shoulder surfaces 46c and 46d of the second portion of stop 42 (FIG. 6) bear against second notch 24. Preferably, stop member 42 further includes a pair of inclined shoulder bosses 46e and 46f projecting outwardly from shoulders 46c and 46d, respectively, in the direction of the second notch 24. Similarly, as shown in FIG. 7, lug 48 is desirably provided with a lug boss 48a projecting outwardly from the underside of the lug toward the shoulder bosses. The bosses 46e, 46f, and 48a are each inclined so that the peaks of the bosses are near the connecting first portion 44 and incline upwardly and outwardly along the surfaces which bear them, as is seen in FIG. 7. These bosses help lock the stop to the core by trapping the core between the first connecting portion 44 and the bosses. When secured to and seated on the core, first portion 44 of stop 42 bears against a surface of core 12. In this seated position with core 12, stop member 42 defines a bolt hole 40 offset laterally from the core 12, because U-shaped second portion 46 extends at least partially into the interior space 50 defined by the gasket assembly 10 (FIG. 1). Consequently, when a bolt or other fastener (not shown) is inserted through bolt hole 40, the bolt will be offset laterally from the core 12. That is, instead of passing through the core, the bolt will pass to one side of the core, thereby providing space for bead 32 to extend alongside the bolt hole.

To fabricate the gasket assembly, the combination of core and stop members is positioned in a suitably configured mold to be provided with elastomeric layers 26, 28 molded to upper and lower surfaces 14, 16 of the core. These elastomeric layers partially overlap the stop members to permanently secure the stops 42 to the gasket assembly 10. Bead 32, including transitional bead sections 34, is formed around each of upper and lower surfaces 14 and 16.

Because stops 42 are recessed slightly from the top surfaces of elastomeric layers 26, 28, compression of the elastomeric layers by the oil pan and block flanges adjacent the fastener holes 40 during a tightening of the bolts will be limited by the stops 42. In particular, the U-shaped portion 46 and lug 48 perform limiting functions against the engine flanges (not shown) This limitation of compression will restrict deformation and displacement of the elastomeric layers 26, 28 so as to prevent splitting of the elastomeric layers around fastener holes 40. Desirably, the stop thickness is no less than about 75% of the combined thickness of the core and elastomeric layers. The construction of the stop member 42 in the manner described herein permits transitional bead sections 34 to be molded in the zones of bolt holes 40 even when the available land area is very limited.

The gasket of the present invention maximizes contact between the gasket assembly and the engine flanges such that regardless of the land area, the stop members will not displace, thereby assuring a continuous sealing function. FEA compression tests conducted on a gasket assembly of the type illustrated using a 3000 lb. load to compress the bead and a 8080 lb. total load with a bead 0.170 inch wide and about 40 inches long showed an internal tensile stress on the bead of 370 psi and an estimated percentage load on the compression stop of 62%. These are well within acceptable stress and load ranges.

From the foregoing, it will be apparent to those skilled in the art that further modifications may be made without departing from the spirit and scope of the invention. Accordingly, the scope of the invention is not to be limited except to the extent made necessary by the claims.

We claim:

1. A gasket assembly comprising:
   a) a rigid annular core member having upper and lower surfaces;
   b) a plurality of spaced, rigid stop members secured to said core member, each stop member having a first portion of a first thickness and a second stop portion of a second substantially greater thickness than said first portion, said second portion substantially defining a fastener hole offset laterally from said core member; and
   c) an elastomeric material substantially covering said upper and lower surfaces of said core member and said first portion of each stop member.

2. The gasket assembly of claim 1 wherein each of said stop members include a lug member integrally connected to said first portion and spaced apart from said second portion.

3. The gasket assembly of claim 2 further comprising elastomeric beads projecting outwardly from and continuously around an elastomeric envelope created by the elastomeric material that substantially covers the upper and lower surfaces of the core member, said beads passing between each of said fastener holes and said lugs.

4. The gasket assembly of claim 1 wherein said second portion of each stop member is U-shaped and has a pair of shoulders connecting said second portion to said first portion.

5. The gasket assembly of claim 1 wherein said core member has inner and outer edges and a plurality of pairs of notches at spaced locations around said core member, one notch of each pair located on said inner edge and one notch located on said outer edge, said notches receiving said stop members.

6. The gasket assembly of claim 1 wherein the thickness of each stop member is less than the combined thickness of said core and an elastomeric envelope created by the elastomeric material that substantially covers the upper and lower surfaces of the core member.

7. A gasket assembly comprising:
   a) a rigid annular core member having upper and lower surfaces and defining an interior space;
   b) a plurality of spaced, rigid stop members, each stop member defining a fastener hole through which a fastener may pass, said stop members each having a first portion of a first thickness, a second portion of a second thickness and a lug, said second thickness being greater than said first thickness, and the lug spaced apart from said second portion, each of said stop members extending laterally into said interior space so that said fastener hole defined by said stop member is offset from said core member;
   c) means for attaching said stop members to said core member at spaced locations around the core; and
   d) an elastomeric covering that comprises an elastomeric bead means extending outwardly from each of said upper and lower surfaces of said rigid core member, each bead means extending longitudinally around said entire gasket assembly and between said second portion and said lug of each stop member.

8. The gasket assembly of claim 7 wherein said lug is of substantially the same thickness as said second portion.

9. The gasket assembly of claim 7 wherein said core member has opposing inner and outer edges, and wherein said stop member attaching means comprises a pair of notches formed along said edges of said core member for each stop member, one notch on each of said inner and outer edges, the notches on said inner edges engaging said second portions of said stop member and the notches on said outer edges engaging said lugs.

10. The gasket assembly of claim 9 wherein said second portion of said stop member is generally U-shaped, and wherein said first portion of said stop member connects said lug to said second portion of said stop member.

11. The gasket assembly of claim 9 wherein the lug and the second portion of each said stop members are spaced apart by said core member.

12. A gasket assembly comprising:
   a) a rigid core member having upper and lower surfaces and inner and outer edges;
   b) a plurality of rigid stop members, said stop members being secured at spaced locations around said core member to said inner and outer edges, each of said stop members including a portion defining a fastener hole and a lug spaced apart from said portion defining a fastener hole by said core member, said fastener hole being offset laterally from said core member;
   c) an elastomeric envelope substantially covering said upper and lower core surfaces, said envelope including upper and lower beads integrally formed with said elastomeric envelope projecting outwardly and continuously around said gasket assembly, said beads passing between each of said portions defining a fastener hole and said lugs; and
   d) said portion defining a fastener hole and said lug each of substantially the same thickness, said thickness being less than the combined thickness of said core member and said elastomeric envelope.

* * * * *